United States Patent [19]
Vullmahn

[11] Patent Number: 5,131,431
[45] Date of Patent: Jul. 21, 1992

[54] SUPPLY AND EXHAUST VALVE

[76] Inventor: Andrew G. Vullmahn, 939 Mounts, Corpus Christi, Tex. 78418

[21] Appl. No.: 796,589

[22] Filed: Nov. 22, 1991

[51] Int. Cl.⁵ ............................................. F16K 11/07
[52] U.S. Cl. ................................ 137/625.23; 137/625.24
[58] Field of Search ............... 137/625.21, 625.22, 137/625.23, 625.24

[56] References Cited

U.S. PATENT DOCUMENTS

| | | | |
|---|---|---|---|
| 1,213,692 | 1/1917 | Schmeltz | 137/625.23 |
| 1,288,356 | 12/1918 | Woods | 137/625.18 X |
| 1,446,547 | 2/1923 | Crowe | 137/625.23 |
| 1,546,579 | 7/1925 | Hammond | 137/625.23 X |
| 2,538,205 | 1/1951 | Leathermon | 137/625.23 |
| 3,036,599 | 5/1962 | Doerfler | 137/625.24 |
| 3,610,283 | 10/1971 | Hill | 137/625.23 |

Primary Examiner—Alan Cohan
Attorney, Agent, or Firm—G. Turner Moller

[57] ABSTRACT

A hydraulic circuit includes a supply and exhaust valve provides a housing having a tapered passage and a tapered plug rotatable in the passage. The plug is biased into sealing engagement with the passage by a spring assembly acting on an inlet conduit providing a power fluid inlet. Rotation of the plug connects the inlet conduit to one of two housing ports to deliver power fluid to either the rod end or the cylinder end of a fluid motor to either retract and extend the piston rod. The plug also provides two additional independent fluid passages connecting other conduits leading to the motor and sump.

11 Claims, 2 Drawing Sheets

SUPPLY AND EXHAUST VALVE

This invention relates to a valve to supply a high pressure fluid to a device and exhaust a low pressure fluid from the device.

There are a variety of situations in which it is desired to control a hydraulic motor. At one extreme, it is desirable to mount a bulldozer or maintainer blade for vertical adjustment by the use of linear hydraulic motors. At another extreme, it may be desirable to raise and lower a toilet seat by use of a hydraulic motor.

It will accordingly be appreciated that valves to deliver hydraulic fluid to and from hydraulic motors are known in the art. Typical devices are found in U.S. Pat. Nos. 1,288,356; 2,538,205; 3,036,599 and 3,610,283. Other disclosures of interest relative to this invention are found in U.S. Pat. Nos. 1,821,027 and 4,291,422.

This invention comprises valve body having a tapered passage therein and a tapered plug valve member in the tapered passage. The inlet to the valve is through a stem connected to and extending axially away from the tapered plug. The valve body provides a series of passages therethrough and the tapered plug valve member provides a first passage network connecting the valve inlet to selected ones of the valve body passages to direct high pressure motive fluid toward a working member, such as a linear hydraulic motor. The tapered plug valve member provides a second passage network connecting selected ones of the valve body passages to receive low pressure or exhaust fluid from the working member and direct the same to a sump or reservoir.

It is an object of this invention to provide an improved supply and exhaust valve.

Another object of this invention is to provide a supply and exhaust valve having a plurality of external conduits to direct fluid between valved ports.

These and other objects of this invention will become more fully apparent as this description proceeds, reference being made to the accompanying drawing and appended claims.

IN THE DRAWINGS

Figure 1:
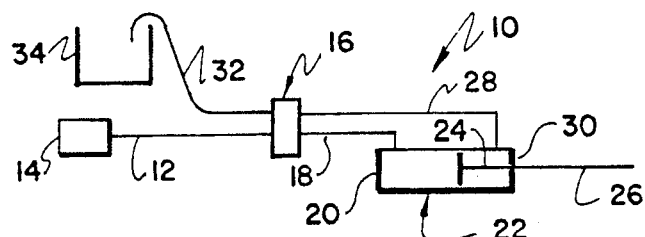
FIG. 1 is a schematic view of a simple hydraulic circuit.

Referring to FIGS. 1, a simple hydraulic circuit 10 is illustrated comprising a conduit 12 leading to a source of fluid pressure 14, a supply and exhaust valve 16 connected to the conduit 12, a conduit 18 leading to the cylinder end 20 of a linear hydraulic motor 22 having a piston 24 and piston rod 26, a conduit 28 connecting the rod end 30 of the motor 22 to the valve 16 and a conduit 32 connecting the valve 16 to a sump or reservoir 34. Those skilled in the art will recognize the circuit 10 as typical of a hydraulic circuit where the fluid is not recirculated. Where the fluid is recirculated, the source of pressure 14 will comprise a pump having its inlet in the sump 34.

The purpose of the supply and exhaust valve 16 is to connect the conduits 12, 18, 28, 32 to extend the piston rod 26 and then to connect the conduits 12, 18, 28, 32 to retract the piston rod 26. To extend the piston rod 26, the conduit 12 connects to the conduit 18 and the conduit 28 connects to the conduit 32. To retract the piston rod 26, the conduit 12 connects to the conduit 28 and the conduit 18 connects to the conduit 32.

To these ends, the supply and exhaust valve 16 comprises, as major components, a housing 36 having a tapered longitudinal passage 38 therethrough, a tapered plug 40 in the passage 38 and having a stem 42 for receiving a handle or knob (not shown) for rotating the plug 40 relative to the housing 36, means 44 biasing the plug 40 into the small end of the passage 38 and providing an inlet conduit 46 rigid with the plug 40 and a series of external conduits as more fully pointed out hereinafter.

The housing 36 is conveniently a cylindrical member 48 having one or more suitable brackets (not shown) for attaching the valve 16 in any suitable location. The passage 38 defines a longitudinal axis 50. The housing 36 provides a first pair of power fluid ports 52, 54 extending through the member 48 and opening into the passage 38 in a first plane. The ports 52, 54 are spaced apart a predetermined angle, illustrated as approximately 90°.

The housing 36 also provides a second pair of fluid ports 56, 58 extending through the member 48 and opening into the passage 38 in a second plane spaced from the first plane. The ports 56, 58 are aligned. The housing 36 also provides a third pair of fluid ports 60, 62 extending through the member 48 and opening into the passage 38 in a third plane spaced from the first and second planes. The ports 60, 62 are also aligned.

Figure 2:
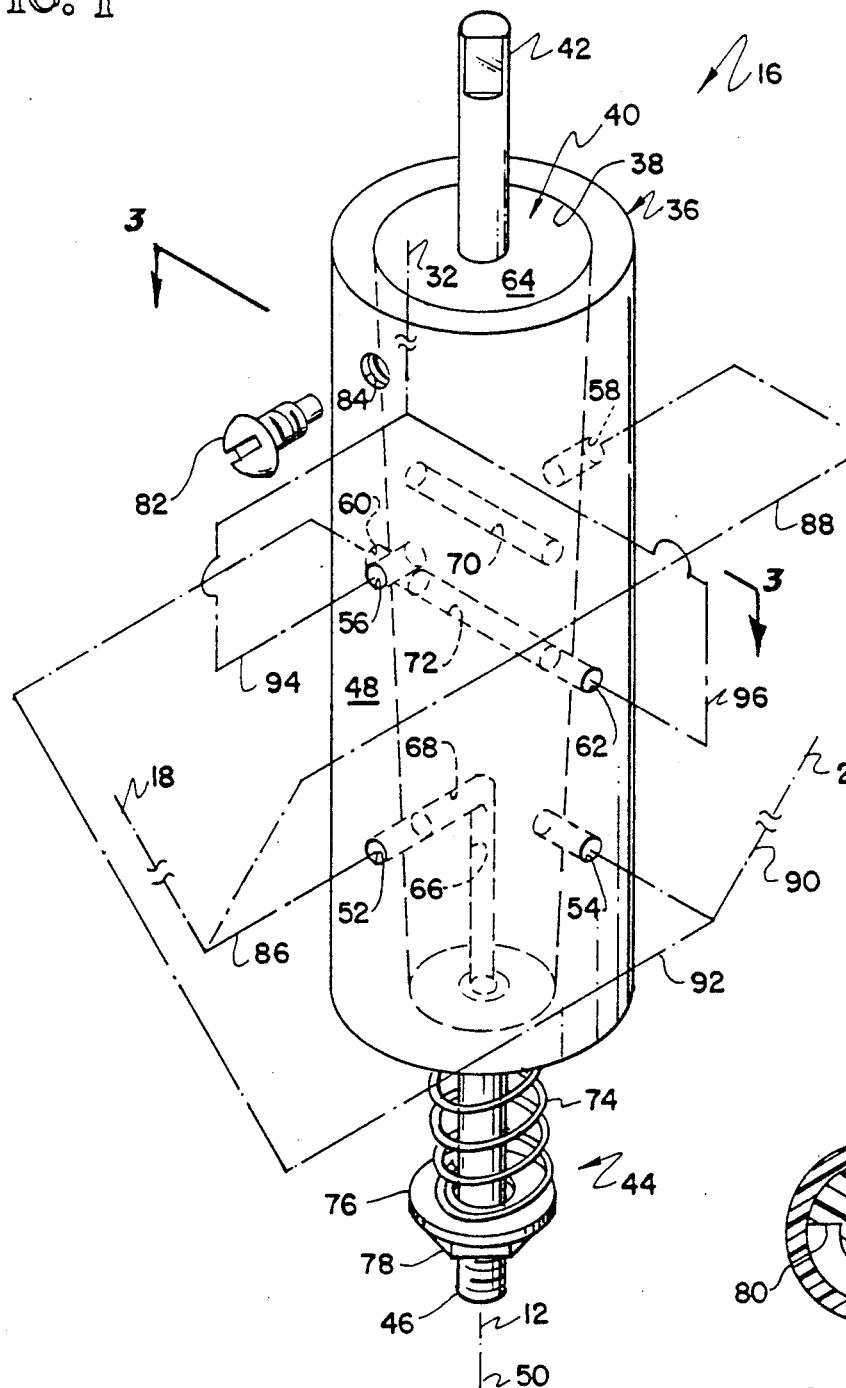
FIG. 2 is an isometric view of a valve of this invention.
Figure 3:
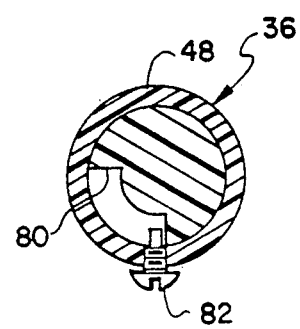
FIG. 3 is a cross-sectional view of the valve of FIG. 2, taken substantially along line 2—2 thereof, as viewed in the direction indicated by the arrows.

The plug 40 includes a tapered member 64 sized to be closely received in the passage 38 and having a first passage 66 in communication with the conduit 46 and providing an offset end 68. As shown in FIG. 2, the plug 40 is rotatable between a first position in which the offset end 68 is in communication with the port 52 corresponding to a piston rod extending position and a second position in which the offset end is in communication with the port 54 corresponding to a piston rod retracting position.

The plug 40 includes a second passage 70 in the second plane and positioned to communicate between the ports 56, 58 and a third passage 72 in the third plane and positioned to communicate between the ports 60, 62. Although the orientation of the ports 56, 58, the ports 60, 62, and the passages 70, 72 may vary widely, the passage 70 communicates with the ports 56, 58 when the offset end 68 communicates with the port 54 and the passage 72 communicates with the ports 60, 62 when the offset end 68 communicates with the port 52.

The biasing means 44 comprises a helical spring 74 surrounding the inlet conduit 46 and bearing at one end against the housing 36 and at the other end against a washer 76 captivated by a nut 78 on the threaded end of the inlet conduit 46. It will accordingly be seen that the biasing means 44 forces the plug 40 downwardly into the passage 38 so the plug 40 seals against the valve housing 36 with or without the use of O-ring seals or the like.

It is desirable to constrain rotary movement of the plug 40 between the first and second positions. To this end, the plug 40 provides a slot 80 of an angular dimension corresponding to the angle between the ports 52, 54, i.e. 90° in the illustrated embodiment. A stop 82 is advanced through a threaded opening 84 in the housing 36 into the slot 80 and thereby constraining the plug 40 for angular movement between the first and second positions.

The valve 16 includes a series of external conduits connecting the ports 52, 54, 56, 58, 60, 62 to the conduits 12, 18, 28, 32 in the hydraulic circuit 10 of FIG. 1. The valve 16 accordingly includes a conduit 86 connecting the port 52 and the conduit 18 and a branch conduit 88 connecting the conduit 86 and the port 58. A conduit 90 connects the port 54 and the conduit 28 while a branch conduit 92 connects the conduit 88 and the port 60. Conduits 94, 96 connect the ports 56, 62 to the conduit 32.

Figure 4:
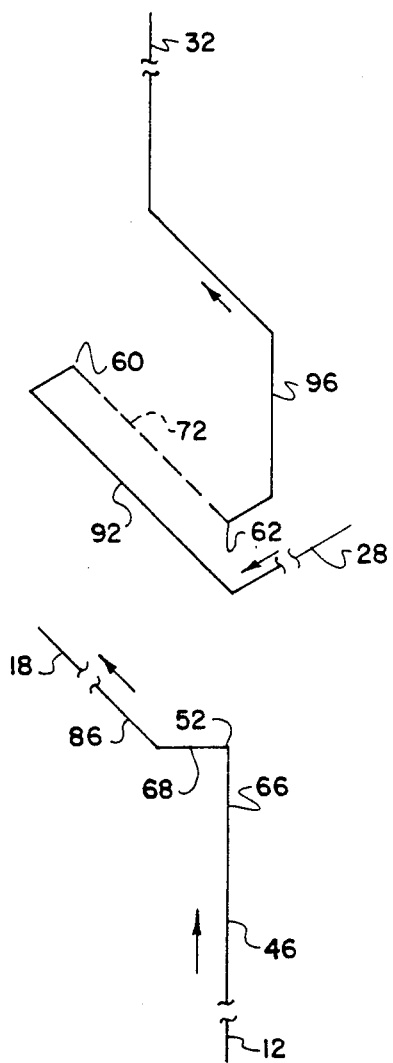
FIG. 4 is a schematic illustration of the flow paths through the valve of FIG. 2 when the valve is positioned to extend the piston rod of the hydraulic motor.

Operation of the valve 16 and the hydraulic circuit 10 should now be apparent. With the stem 42 turned to a location where the offset leg 68 is between the ports 52, 54, the valve 16 is closed and no fluid flow occurs. Moving the stem 42 in a clockwise direction causes the offset leg 68 to register with the port 52 as shown in FIG. 2 in a position to extend the piston rod 26. As shown in FIG. 2 and schematically shown in FIG. 4, high pressure fluid passes through the conduit 12 and enters the valve 16 through the inlet conduit 46 and flows through the axial passage 66, the offset leg 68, through the port 52 and then through the conduits 86, 18 to the cylinder end 20 of the hydraulic motor 22. Fluid from the rod end 30 of the motor 22 flows through the conduits 28, 92, then through the port 60, plug passage 72 and port 60, then through the conduits 96, 32 into the reservoir 34.

Figure 5:
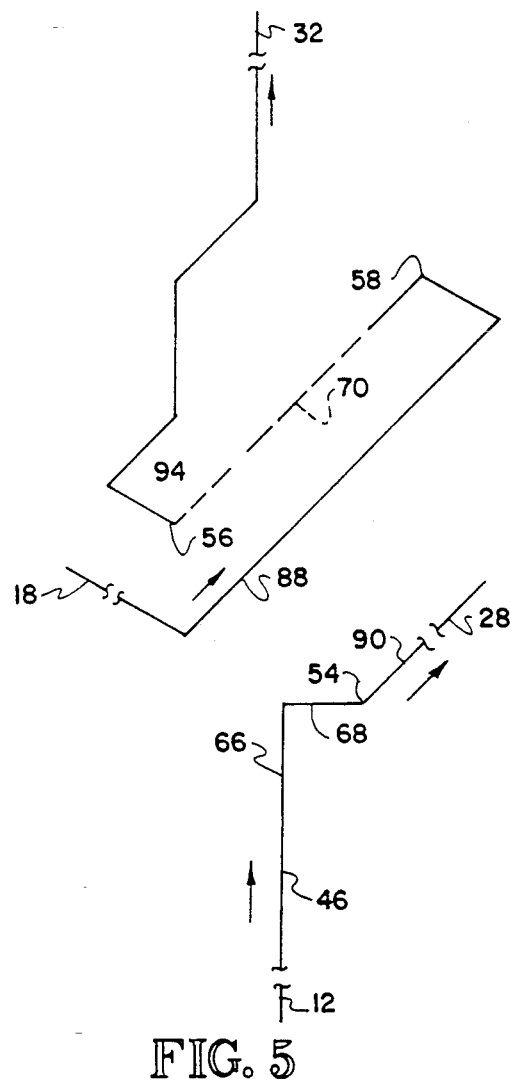
FIG. 5 is a schematic illustration of the flow paths through the valve of FIG. 2 when the valve is positioned to retract the piston rod of the hydraulic motor.

When the piston rod 26 is extended as far as desired, the stem 42 is rotated until the offset passage 68 no longer registers with the port 52 and fluid flow from the pressure source 14 stops. In addition, flow from the rod end 30 of the motor 22 stops because the plug passage 72 moves out of registration with the ports 60, 62. When it is desired to retract the piston rod 26, the stem 42 is turned in a counterclockwise direction so the offset passage 68 registers with the port 54, as shown schematically in FIG. 5. High pressure fluid from the conduit 12 passes through the inlet conduit 46, passage 66 and offset passage leg 68, port 54, and passages 90, 28 to the rod end 30 of the motor 22. This causes the piston rod 26 to retract inside the cylinder and force fluid from the cylinder end 20, through conduits 18, 88, through port 58, plug passage 70 and port 56 and then through conduits 94, 32 to the reservoir 34.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A supply and exhaust valve for placement in a fluid circuit including a power fluid circuit conduit, first and second fluid circuit conduits communicating between the valve and a fluid motor and a third fluid circuit conduit communicating between the valve and a reservoir, the valve comprising
    a housing having a tapered longitudinal passage therethrough, a first pair of fluid ports opening into the passage in a first plane, a second pair of fluid ports opening into the passage in a second plane and a third pair of fluid ports opening into the passage in a third plane;
    a tapered plug rotatable in the passage having an actuating stem at one end for rotating the plug between first and second positions and a power fluid inlet conduit at the other end for connection to the power fluid circuit conduit, the plug providing
        a first plug passage having a first end in communication with the power fluid inlet conduit and a second end in the first plane for delivering power fluid to a first of the first pair of fluid ports when the plug is in the first position and to a second of the first pair of fluid ports when the plug is in the second position,
        a second plug passage in the second plane for communicating between the second ports when the second plug passage registers therewith, and
        a third plug passage in the third plane for communicating between the third ports when the third plug passage registers therewith;
    a first valve conduit, external of the housing, connected to a first of the first ports for communication with the first fluid circuit conduit,
    a second valve conduit, external of the housing, communicating between the first valve conduit and a first of the second ports,
    a third valve conduit, external of the housing, connected to a second of the second ports and disposed for communication with the third fluid circuit conduit,
    a fourth valve conduit, external of the housing, connected to the second of the first ports and disposed for communication with the second fluid circuit conduit,
    a fifth valve conduit, external of the housing, communicating between the fourth valve conduit and a first of the third ports, and
    a sixth valve conduit, external of the housing, connected to a second of the third ports and disposed for communication with the third fluid circuit.

2. The supply and exhaust valve of claim 1 wherein the first pair of fluid ports are unaligned, the second pair of fluid ports are aligned and the third pair of fluid ports are aligned.

3. The supply and exhaust valve of claim 2 wherein the first plug passage is generally L-shaped having a first leg communicating with the inlet power fluid inlet conduit and a second leg in the first plane.

4. The supply and exhaust valve of claim 2 wherein the second and third plug passages are generally linear.

5. The supply and exhaust valve of claim 1 wherein the plug provides an arcuate notch in the periphery thereof and further comprising means constraining rotary movement of the plug between the first and second positions, the constraining means comprising the notch and a member extending through the valve body into the notch.

6. The supply and exhaust valve of claim 1 wherein, in the first position of the tapered plug member,
    the first plug passage communicates with the first of the first ports and the first fluid circuit conduit and does not communicate with the second of the first ports,
    the second plug passage is out of register with and does not communicate between the second ports, and the third plug passage communicates with the third ports and provides communication between the third fluid circuit conduit and the second fluid circuit conduit.

7. The supply and exhaust valve of claim 1 wherein, in the second position of the tapered plug member, the first plug passage communicates with the second of the first ports and the second fluid circuit conduit and does not communicate with the first of the first ports, the second plug passage communicates with the second ports and provides communication between the third fluid circuit conduit and the first fluid circuit conduit, and the third plug passage is out of register with and does not communicate with the third ports.

8. A supply and exhaust valve for placement in a fluid circuit including a power fluid circuit conduit, first and second fluid circuit conduits communicating between the valve and a fluid motor and a third fluid circuit conduit communicating between the valve and a reservoir, the valve comprising a housing having a tapered longitudinal passage therethrough, a first pair of fluid ports opening into the passage in a first plane, a second pair of fluid ports opening into the passage in a second plane and a third pair of fluid ports opening into the passage in a third plane;

a tapered plug rotatable in the passage having an actuating stem at one end for rotating the plug between first and second positions and a power fluid inlet conduit at the other end for connection to the power fluid circuit conduit, the plug providing a first plug passage having a first end in communication with the power fluid inlet conduit and a second end in the first plane for delivering power fluid to a selected one of the first pair of fluid ports, a second plug passage in the second plane for communicating between the second ports when the second plug passage registers therewith, and a third plug passage in the third plane for communicating between the third ports when the third plug passage registers therewith;

a first valve conduit, external of the housing, communicating between a first of the first ports and the first fluid circuit conduit, a second valve conduit, external of the housing, communicating between the first of the first ports and a first of the second ports, a third valve conduit, external of the housing, communicating between the second of the second ports and the third fluid circuit conduit, a fourth valve conduit, external of the housing, communicating between the second of the first ports and the second fluid circuit conduit, a fifth valve conduit, external of the housing, communicating between the second of the first ports and a first of the third ports, and a sixth valve conduit, external of the housing, communicating between a second of the third ports and the third fluid circuit conduit.

9. The supply and exhaust valve of claim 8 wherein the first pair of fluid ports are unaligned, the second pair of fluid ports are aligned and the third pair of fluid ports are aligned.

10. The supply and exhaust valve of claim 8 wherein, in the first position of the tapered plug member, the first plug passage communicates with the first of the first ports and the first fluid circuit conduit and does not communicate with the second of the first ports, the second plug passage is out of register with and does not communicate between the second ports, and the third plug passage communicates with the third ports and provides communication between the third fluid circuit conduit and the second fluid circuit conduit.

11. The supply and exhaust valve of claim 8 wherein, in the second position of the tapered plug member, the first plug passage communicates with the second of the first ports and the second fluid circuit conduit and does not communicate with the first of the first ports, the second plug passage communicates with the second ports and provides communication between the third fluid circuit conduit and the first fluid circuit conduit, and the third plug passage is out of register with and does not communicate with the third ports.

* * * * *